(12) United States Patent
Badam et al.

(10) Patent No.: US 11,909,810 B2
(45) Date of Patent: Feb. 20, 2024

(54) IMAGE DATA SEGMENTATION AND TRANSMISSION

(71) Applicant: Microsoft Technology Licensing, LLC, Redmond, WA (US)

(72) Inventors: Anirudh Badam, Issaquah, WA (US); Ranveer Chandra, Kirkland, WA (US); Youjie Li, Champaign, IL (US); Sagar Ramanand Jha, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 17/661,970

(22) Filed: May 4, 2022

(65) Prior Publication Data

US 2022/0263921 A1    Aug. 18, 2022

Related U.S. Application Data

(63) Continuation of application No. 16/746,105, filed on Jan. 17, 2020, now Pat. No. 11,336,741.

(Continued)

(51) Int. Cl.
| | |
|---|---|
| *G06T 7/10* | (2017.01) |
| *H04L 67/06* | (2022.01) |
| *G06T 7/30* | (2017.01) |
| *G06T 7/40* | (2017.01) |
| *G06T 9/00* | (2006.01) |

(Continued)

(52) U.S. Cl.
CPC ............... *H04L 67/06* (2013.01); *G06T 7/10* (2017.01); *G06T 7/11* (2017.01); *G06T 7/30* (2017.01); *G06T 7/40* (2013.01); *G06T 9/00* (2013.01); *G06V 20/13* (2022.01); *H04L 67/5651* (2022.05)

(58) Field of Classification Search
CPC ....... H04L 67/2828; H04L 67/06; G06T 7/11; G06T 9/00; G06T 7/40; G06T 7/10; G06T 7/30; G06K 9/0063
See application file for complete search history.

(56) References Cited

U.S. PATENT DOCUMENTS

| | | | |
|---|---|---|---|
| 2004/0032882 A1* | 2/2004 | Kane | ...................... H04L 67/04 370/477 |
| 2005/0083552 A1* | 4/2005 | Kaburagi | ................ G06T 5/002 358/2.1 |

(Continued)

*Primary Examiner* — Christopher M Brandt
(74) *Attorney, Agent, or Firm* — Alleman Hall & Tuttle LLP

(57) ABSTRACT

A computing device is provided, including a logic subsystem with one or more processors, and memory storing instructions executable by the logic subsystem. These instructions are executed to obtain one or more source images, segment the one or more source images to generate a plurality of segments, determine a priority order for the plurality of segments, and transmit the plurality of segments to a remote computing device in the priority order. The plurality of segments are spatial components generated by spatial decomposition of the one or more source images and/or frequency components that are generated by frequency decomposition of the one or more source images. A remote computing device may receive these components in priority order, and perform certain algorithms on individual components without waiting for the entire image to upload.

20 Claims, 17 Drawing Sheets

Related U.S. Application Data

(60) Provisional application No. 62/929,700, filed on Nov. 1, 2019.

(51) Int. Cl.
*G06T 7/11* (2017.01)
*H04L 67/5651* (2022.01)
*G06V 20/13* (2022.01)

(56) References Cited

U.S. PATENT DOCUMENTS

| | | | | |
|---|---|---|---|---|
| 2011/0001994 A1* | 1/2011 | Matsuda | ............... | H04N 19/17 358/1.9 |
| 2014/0056519 A1* | 2/2014 | Gupta | ................... | G06T 7/174 382/173 |
| 2019/0164314 A1* | 5/2019 | Wang | ................... | H04N 19/59 |
| 2019/0355099 A1* | 11/2019 | Krishnapura Subbaraya | ............ | G06T 5/002 |

* cited by examiner

IMAGE DATA SEGMENTATION AND TRANSMISSION

CROSS REFERENCE TO RELATED APPLICATIONS

This application is a continuation of U.S. Non-Provisional patent application Ser. No. 16/746,105, filed Jan. 17, 2020, which claims priority to U.S. Provisional Patent Application Ser. No. 62/929,700, filed Nov. 1, 2019, the entirety of each of which is hereby incorporated herein by reference for all purposes.

BACKGROUND

Transferring images or large data files from an edge device to a cloud server is a significant bottleneck for many cloud-based applications. For example, a drone with a camera may gather large amounts of data within a short period of time, and transferring such large amounts of data to the cloud can take several days in some cases. Data transfer to the cloud server can be a challenge, especially for edge devices that are situated in remote settings where network capacity and bandwidth are constrained.

SUMMARY

A computing device is provided, comprising a logic subsystem including one or more processors and memory storing instructions executable by the logic subsystem. The instructions are executable to obtain one or more source images, segment the one or more source images to generate a plurality of segments, determine a priority order for the plurality of segments, and transmit the plurality of segments to a remote computing device in the priority order. The plurality of segments are spatial components generated by spatial decomposition of the one or more source images and/or frequency components that are generated by frequency decomposition of the one or more source images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
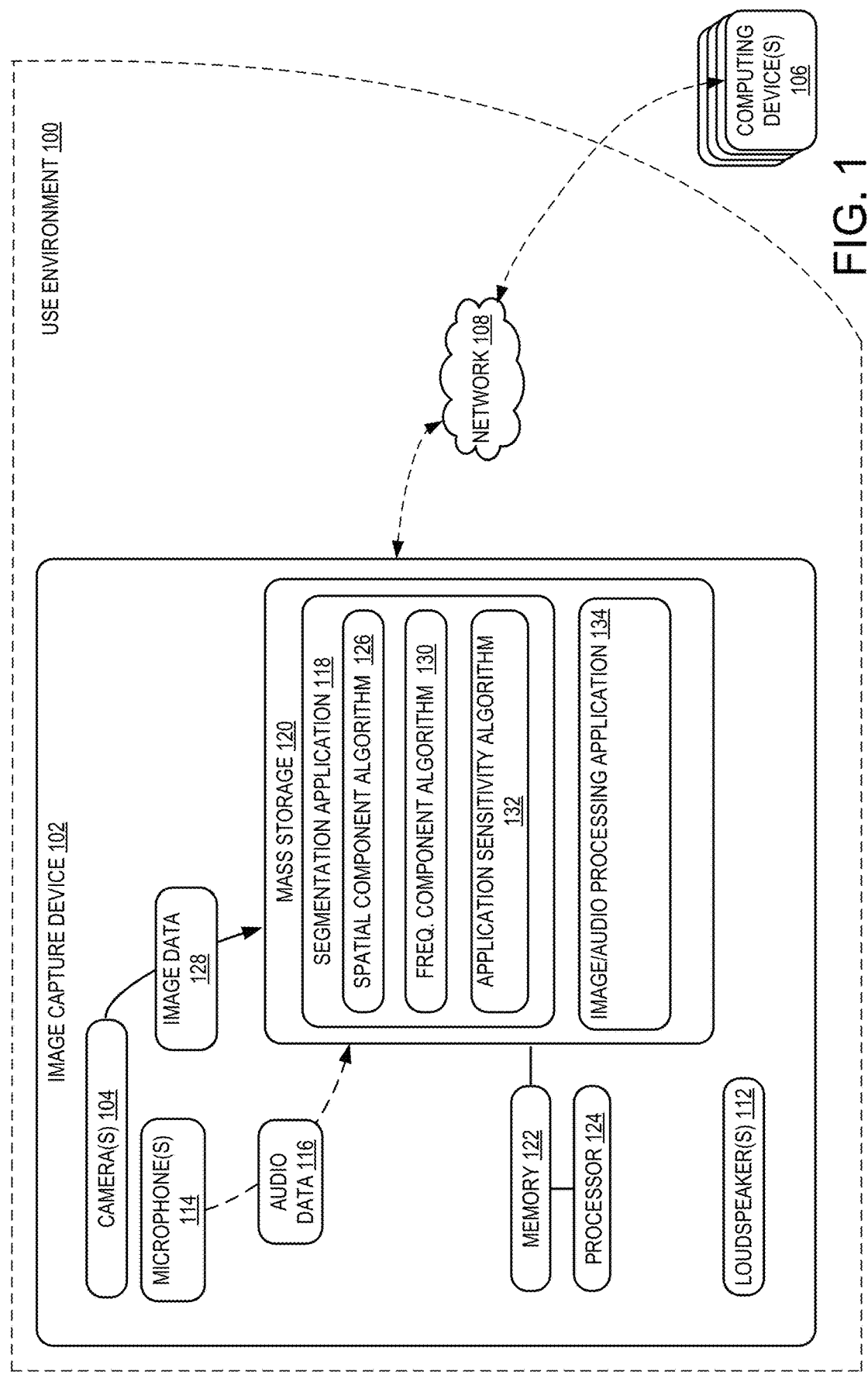
FIG. 1 shows a schematic view of an example computing environment in which the edge device of FIG. 1 may be enacted.

FIG. 1 schematically shows an example use environment 100 in which an edge device 102, embodied as an image capture device in this example use environment 100, captures images of the real world using one or more cameras 104. The cameras 104 may be mounted on a stationary or mobile device, such as vehicles, drones, satellites, and machinery, for example. The remote computing device 106, which may be configured as a cloud server, stitches together images acquired by one or more cameras 104. The image capture device 102 may include components that communicatively couple the device with one or more other computing devices 106, which may be cloud servers. For example, the image capture device 102 may be communicatively coupled with the other computing device(s) 106 via a network 108. In some examples, the network 108 may take the form of a local area network (LAN), wide area network (WAN), wired network, wireless network, personal area network, or a combination thereof, and may include the Internet.

The edge device 102 is configured to divide the captured images into segments, determine one or more segments that to be high priority for an image processing application 134 that is executed on the edge device 102. The edge device 102 then determines a given priority order in which the segments are transmitted or uploaded to the one or more computing devices 106 based on the determination that the one or more segments are high priority for the image processing application 134, and subsequently transmits the segments to the one or more computing devices 106 based on the given priority order. In some embodiments, the captured images may be filtered by the edge device 102 to select a subset of the plurality of captured images to segment and transmit to the one or more computing devices 106, where the subset of the plurality of captured images are images of a target object for analysis.

The image capture device 102 includes one or more cameras 104 that each acquire one or more images of the use environment 100. In some examples, the camera(s) 104 comprises one or more visible light cameras configured to capture visible light image data from the use environment 100. Example visible light cameras include an RBG camera and/or a grayscale camera. The camera(s) 104 also may include one or more depth image sensors configured to capture depth image data for the use environment 100. Example depth image sensors include an infrared time-of-flight depth camera and an associated infrared illuminator, an infrared structured light depth camera and associated infrared illuminator, and a stereo camera arrangement.

The image capture device 102 may be communicatively coupled to a display 110, which may be integrated with the image capture device 102 (e.g. within a shared enclosure) or may be peripheral to the image capture device 102. The image capture device 102 also may include one or more electroacoustic transducers, or loudspeakers 112, to output audio. In one specific example in which the image capture device 102 functions as a video conferencing device, the loudspeakers 112 receive audio from computing device(s) 106 and output the audio received, such that participants in the use environment 100 may conduct a video conference with one or more remote participants associated with computing device(s) 106. Further, the image capture device 102 may include one or more microphone(s) 114 that receive audio data 116 from the use environment 100. While shown in FIG. 1 as integrated with the image capture device 102, in other examples one or more of the microphone(s) 114, camera(s) 104, and/or loudspeaker(s) 112 may be separate from and communicatively coupled to the image capture device 102.

The image capture device 102 includes a segmentation application 118 that may be stored in mass storage 120 of the image capture device 102. The segmentation application 118 may be loaded into memory 122 and executed by a processor 124 of the image capture device 102 to perform one or more of the methods and processes described in more detail below. An image and/or audio processing application 134 may also be stored in the mass storage 120 of the image capture device 102, configured to process the segments or components of the images generated by the segmentation application 118.

The segmentation application 118 processes one or more source images captured by the image capture device 102, and generates a plurality of segments based on the one or more source images using the spatial component algorithm 126 for generating spatial components and/or the frequency component algorithm 130 for generating frequency components. The plurality of segments are generated as spatial components generated by spatial decomposition of the one or more source images and/or frequency components that are generated by frequency decomposition of the one or more source images. The plurality of spatial components may identify spatial features within the source images. These spatial features are not particularly limited, and may include landmarks, man-made structures, vegetation, bodies of water, sky, and other visual features that are captured in the source images.

Although FIG. 1 depicts the mass storage 120 with the segmentation application 118 and image/audio processing application 134 in the image capture device 102 configured to transmit the image components to the computing device(s) 106, it will be appreciated that the computing device(s) 106 may also be configured with a mass storage storing image data and a segmentation application similarly to the image capture device 102, so that the segmentation application executed on the computing device(s) 106 may generate components based on the stored image data and transmit the components in priority order to the edge device 102 or other computing devices via the network 108.

Figure 2:
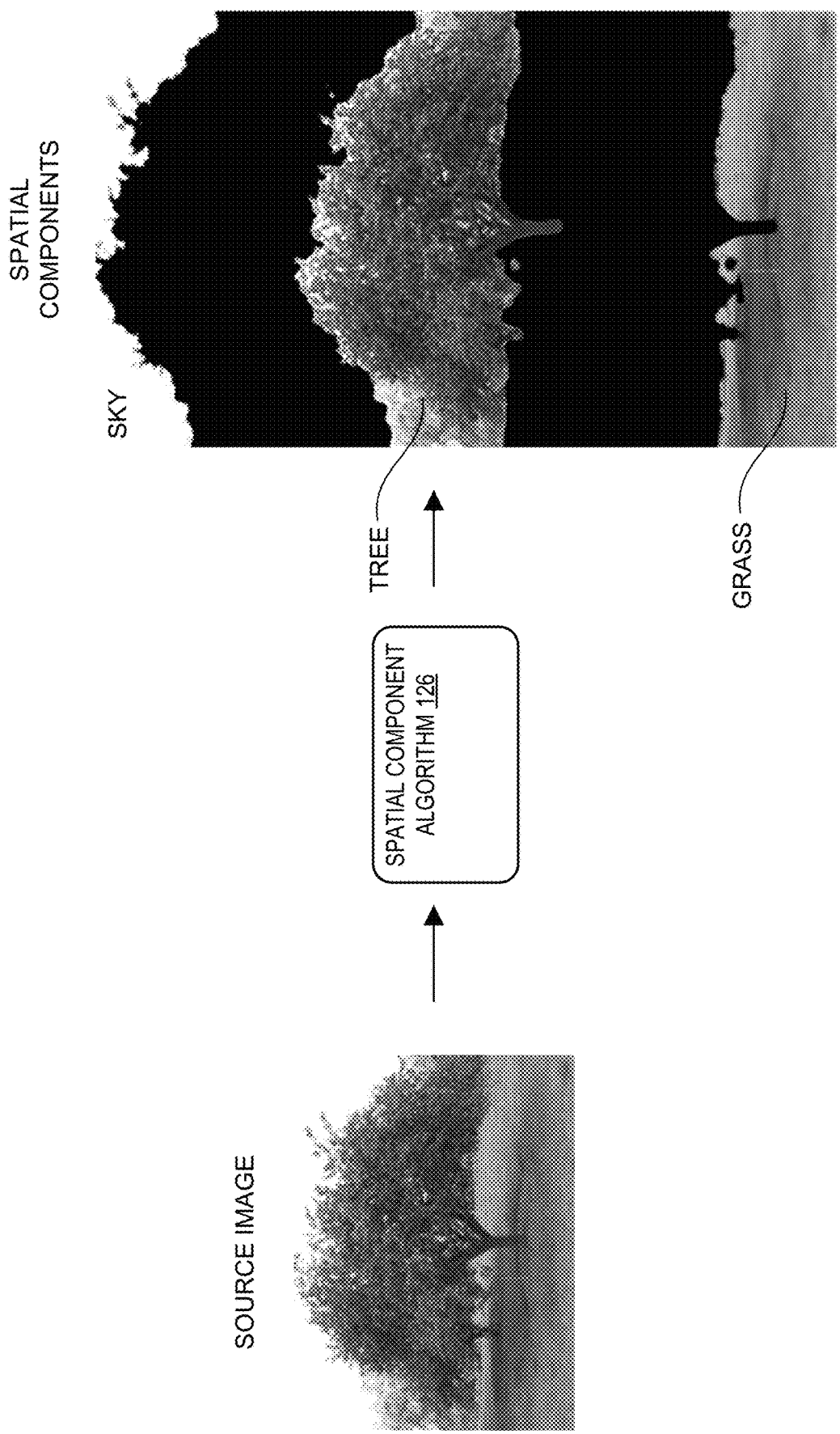
FIG. 2 is an illustration of the segmentation of a source image by the spatial component algorithm into different spatial components according to one example.
Figure 3A:
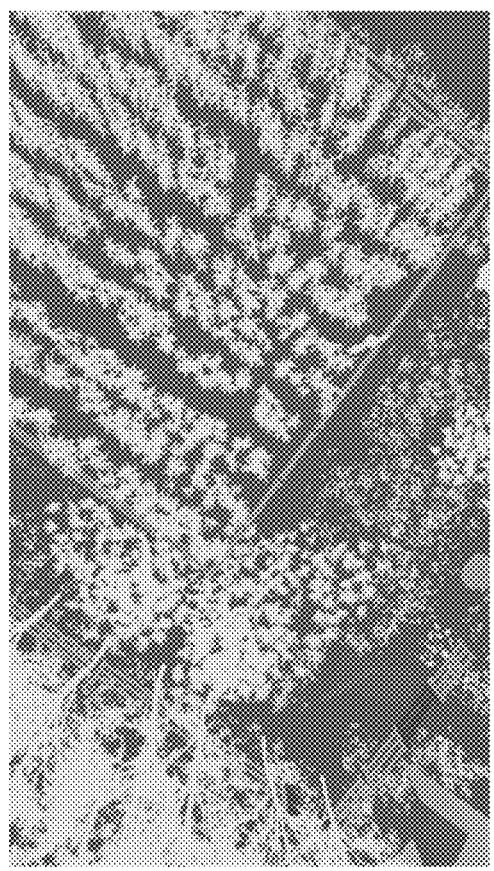
FIGS. 3A and 3B are illustrations of the labelling of visual features of simulated images as part of the training that is applied to generate the spatial component algorithm.
Figure 3A:
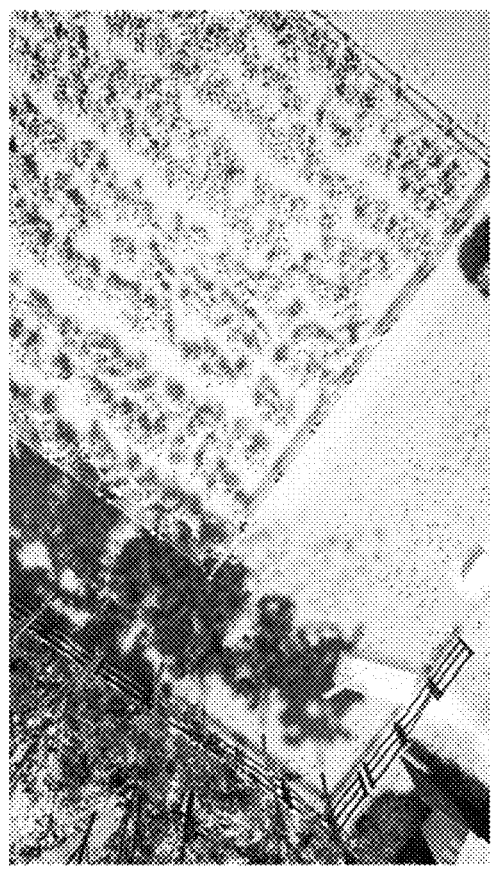
Figure 3B:
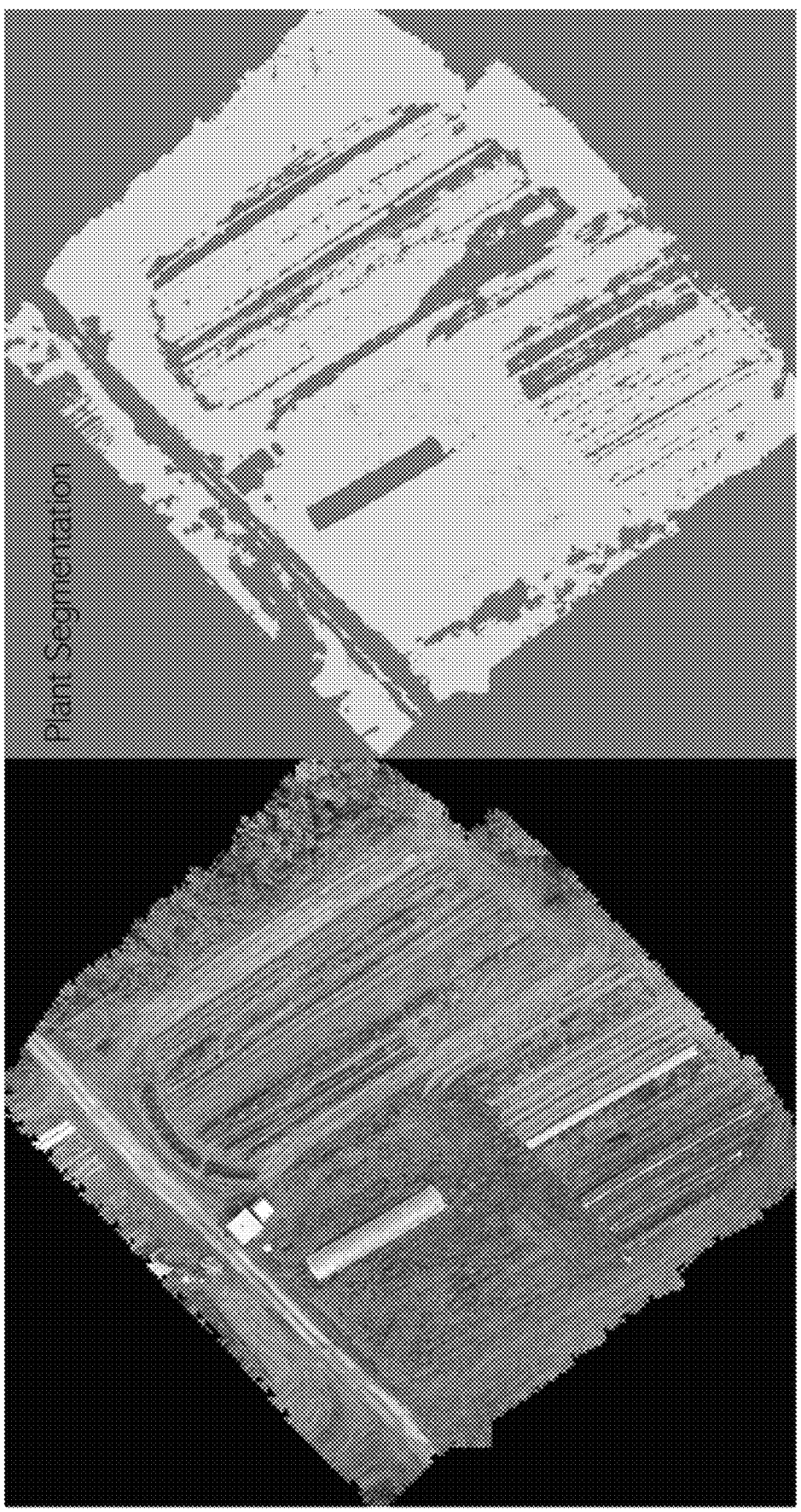

Turning to FIG. 2, in a first implementation of generating spatial components, the plurality of spatial components may be generated based on domain knowledge. For example, a segmentation application 118 may incorporate a spatial component algorithm 126 that is configured to identify features within the source images and generate spatial components accordingly. As used herein, a spatial component of an image refers to a portion of an image that is clipped out of the image. For example, the spatial component algorithm may contain logic to identify a particular feature and draw a clipping boundary (i.e., path) around a region of the image within which the object is located. The image may be modified by extracting the image data within the clipping boundary and storing it in a separate file (or tile within an integrated file) as the spatial component, for example. In agricultural embodiments, the segmentation application 118 may incorporate a spatial component algorithm 126 that is configured to identify trees, grass, and the sky, and generate spatial components corresponding to these identified features. Accordingly, spatial components corresponding to trees, spatial components corresponding to grass, and spatial components corresponding to the sky are generated by the segmentation application 118. This spatial component algorithm 126 may be generated via a machine learning algorithm or simulator that is trained on images of visual features with labels corresponding to the visual features. As an example, a simulator that is trained on visual features of trees, grass, and farms may be configured to generate spatial components corresponding to trees, grass, and farms. As illustrated in FIG. 3A, the machine learning algorithm may be trained on simulated images to label portions of the simulated images as the ground, for example. Further, as illustrated in FIG. 3B, the machine learning algorithm may further be trained on generated spatial components to identify features within the spatial components, such as plants or vegetation.

In a second implementation of generating spatial components, the plurality of spatial components may be generated based on human input. The segmentation application 118 may execute the spatial component algorithm 126 to receive an input from a user identifying features within the source images and generate spatial components accordingly. For example, in agricultural embodiments, the user may input data to the segmentation application 118 identifying the trees, grass, and the sky in the source images, and the segmentation application 118 may generate spatial components based on the data input by the user. Accordingly, in this example, spatial components corresponding to trees, spatial components corresponding to grass, and spatial components corresponding to the sky may be generated by the segmentation application 118.

In an implementation of determining a priority order for transmitting the components, the plurality of components may be generated by the segmentation application 118, and then a priority order for the components may be determined by the segmentation application 118 based on an application sensitivity algorithm 132. The application sensitivity algorithm 132 may add noise to each of the components, or degrade the quality of each of the components, and determine an effect that the addition of noise or degradation of quality of each of the components has on an indication monitored by the application sensitivity algorithm 132. For example, the indication may be a quantitative measurement of objects, such as a quantity of fruit or insects, captured in the source images. When the indication changes beyond a predetermined threshold, or crosses a predetermined threshold, the segmentation application determines that the component is high priority. In the example of an indication being a quantity of fruit, when the quantity of fruit measured in the spatial component corresponding to the tree drops dramatically as a result of the degradation of the component, this change in indication may lead the indication to cross the predetermined threshold to determine that the spatial component corresponding to the tree is high priority. It will be appreciated that the application sensitivity algorithm 132 may be applied to spatial components and frequency components to determine the priority order in which the spatial components and frequency components are transmitted to the remote computing device, so that the highest priority, or the most important components are received by the remote computing device first.

Figure 4:
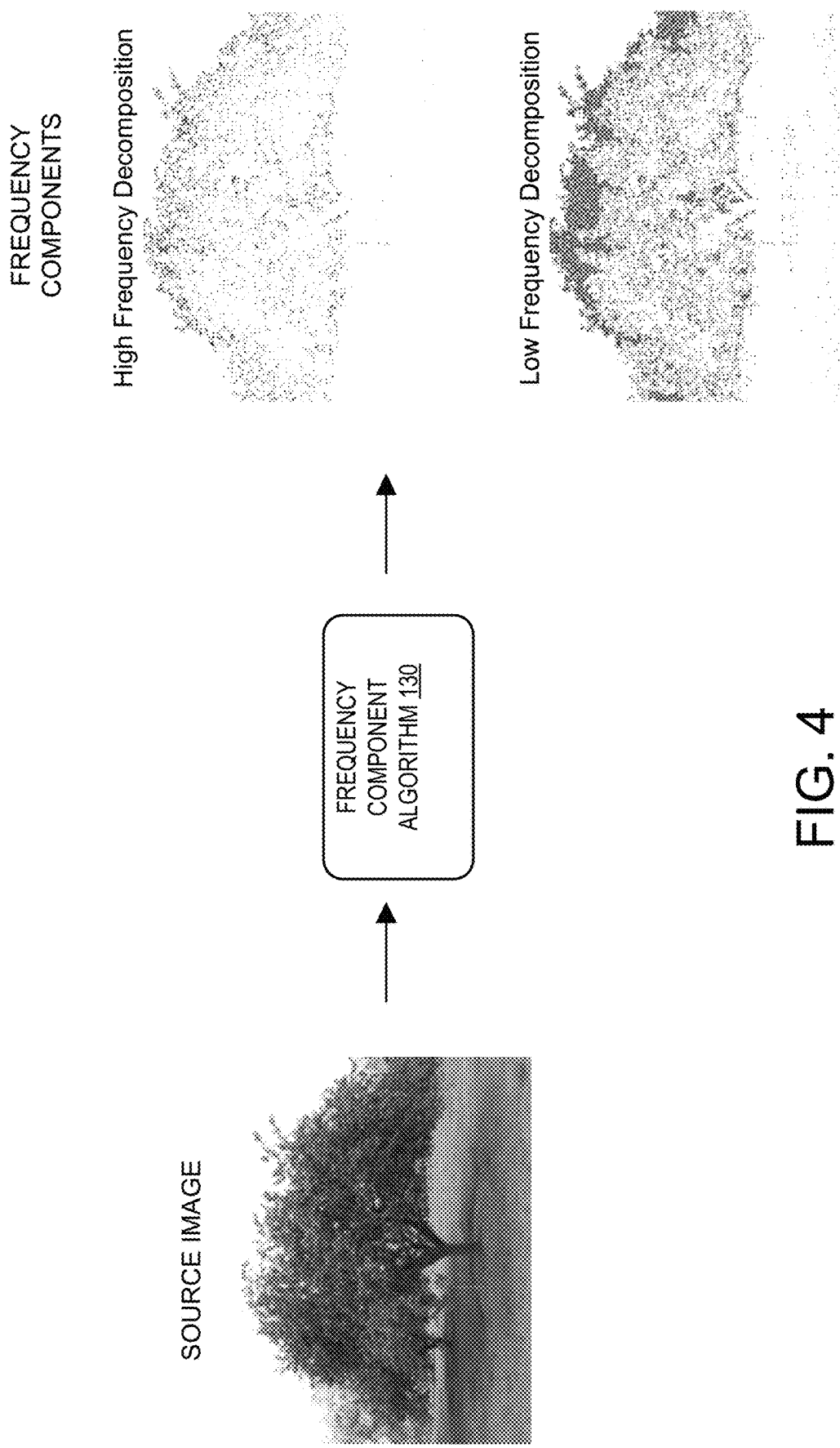
FIG. 4 is an illustration of the segmentation of a source image by the frequency component algorithm into different frequency components according to one example.

Turning to FIG. 4, when the segmentation application 118 processes one or more source images captured by the image capture device 102, and generates a plurality of segments based on the one or more source images, the plurality of segments may also comprise a plurality of frequency components, which are generated by applying the frequency component algorithm 130 to perform frequency decomposition on the source images. In other words, the images may be decomposed based on a frequency of visual characteristics. That is, blocks of the images may be transformed into the frequency domain, and frequency coefficients may be quantized and entropy coded. Alternatively, the frequency decomposition may be performed as a degradation of the image quality of the images, a wavelet based decomposition, or any decomposition technique in which there is a base onto which each delta is applied to increase image quality.

Figure 5:
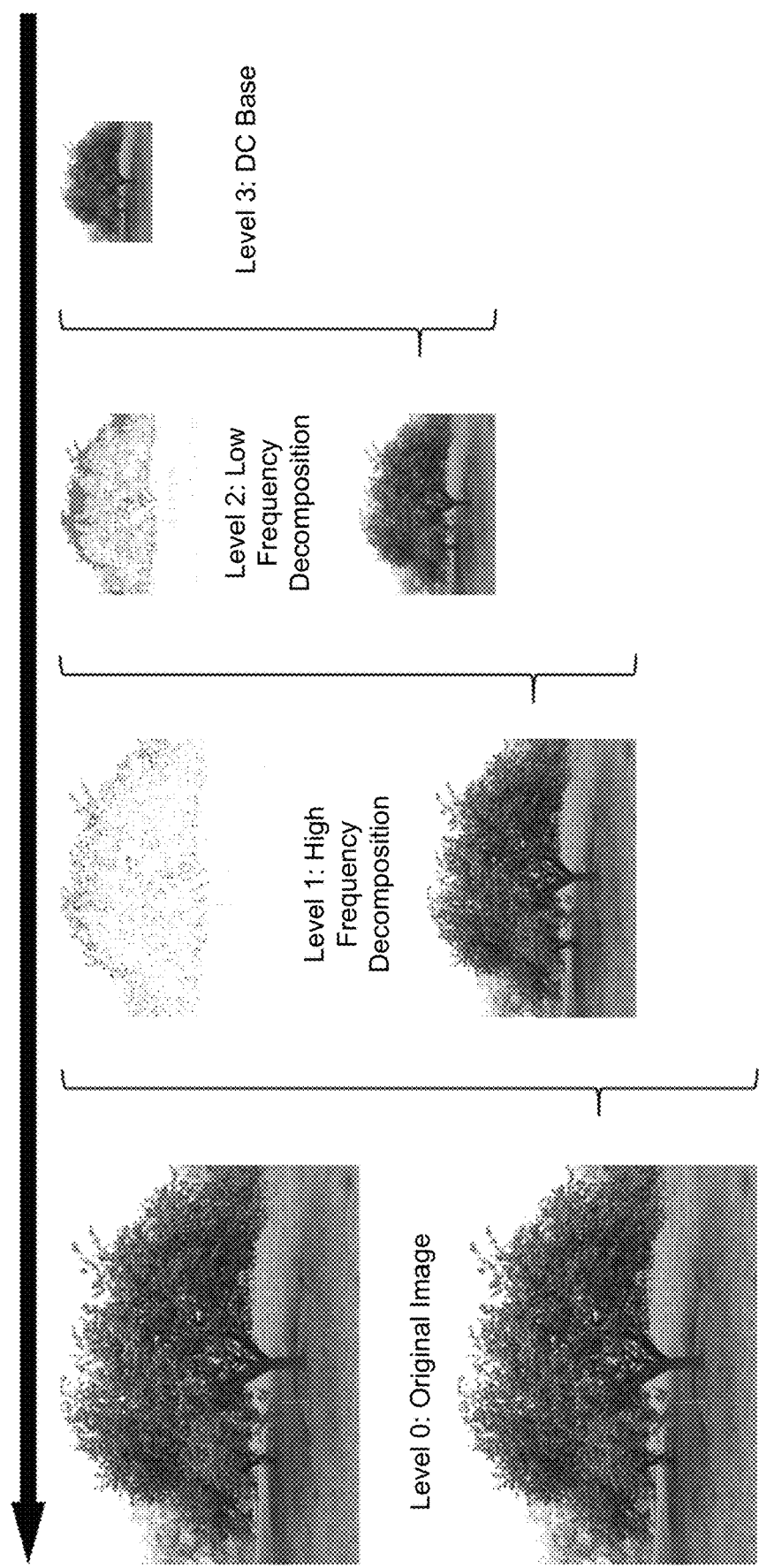
FIG. 5 is an illustration of the different levels of frequency decomposition performed by the frequency component algorithm according to one example.

As illustrated in FIG. 5, in one implementation of frequency decomposition, three frequency components are generated for one source image via three different frequency decomposition techniques: high frequency decomposition, low frequency decomposition, and DC base. It will be appreciated that the number of frequency components is not particularly limited, and more than three frequency decomposition segments may be generated. The frequencies at which the frequency decomposition techniques are executed may be adjusted depending on the amount of available bandwidth to transmit the image components to the remote computing devices via the network, so that the resolution of each frequency component depends on the amount of available bandwidth. The source image may be encoded in a compression format that inherently supports frequency decomposition, such as but not limited to JPEG XR, JPEG 2000, or AV1, for example. The support for frequency decomposition in these compression formats lies in the fact that these encoding mechanisms identify frequencies for their own encoding.

Referring to FIG. 5, when frequency components are transmitted to the remote computing device by the segmentation application, the frequency component corresponding to DC base (level 3) may be transmitted first, followed by the frequency component corresponding to the low frequency decomposition (level 2) and the frequency component corresponding to the high frequency decomposition (level 1), and then the remote computing device may then stitch or assemble together the original image (level 0) once all the frequency components of the source image are received. It will be appreciated that the remote computing device may not wait until the original image is reconstituted to perform processing tasks on the image. For example, in agricultural embodiments involving fruit trees, at level 3, fruit counts may be performed. At level 2, yield predictions may be performed. At level 1, genotyping may be performed. Accordingly, tasks are performed that are appropriate for the image quality or fidelity reached at certain stages in the image upload process.

It is preferable for frequency decomposition to be performed on the source images, followed by spatial decomposition to generate the segments, as further discussed below. For example, three frequency components may be generated by the segmentation application 118, and then three spatial components generated for each of the generated frequency components. However, it will be appreciated that in other embodiments, only spatial decomposition (e.g., first method 500 in FIG. 6A) or only frequency decomposition (e.g., fourth method 800 in FIG. 8A) may be performed to generate the segments. Alternatively, spatial decomposition may be performed on the source images, followed by frequency decomposition to generate the segments, as described in FIG. 8B.

Figure 6A:
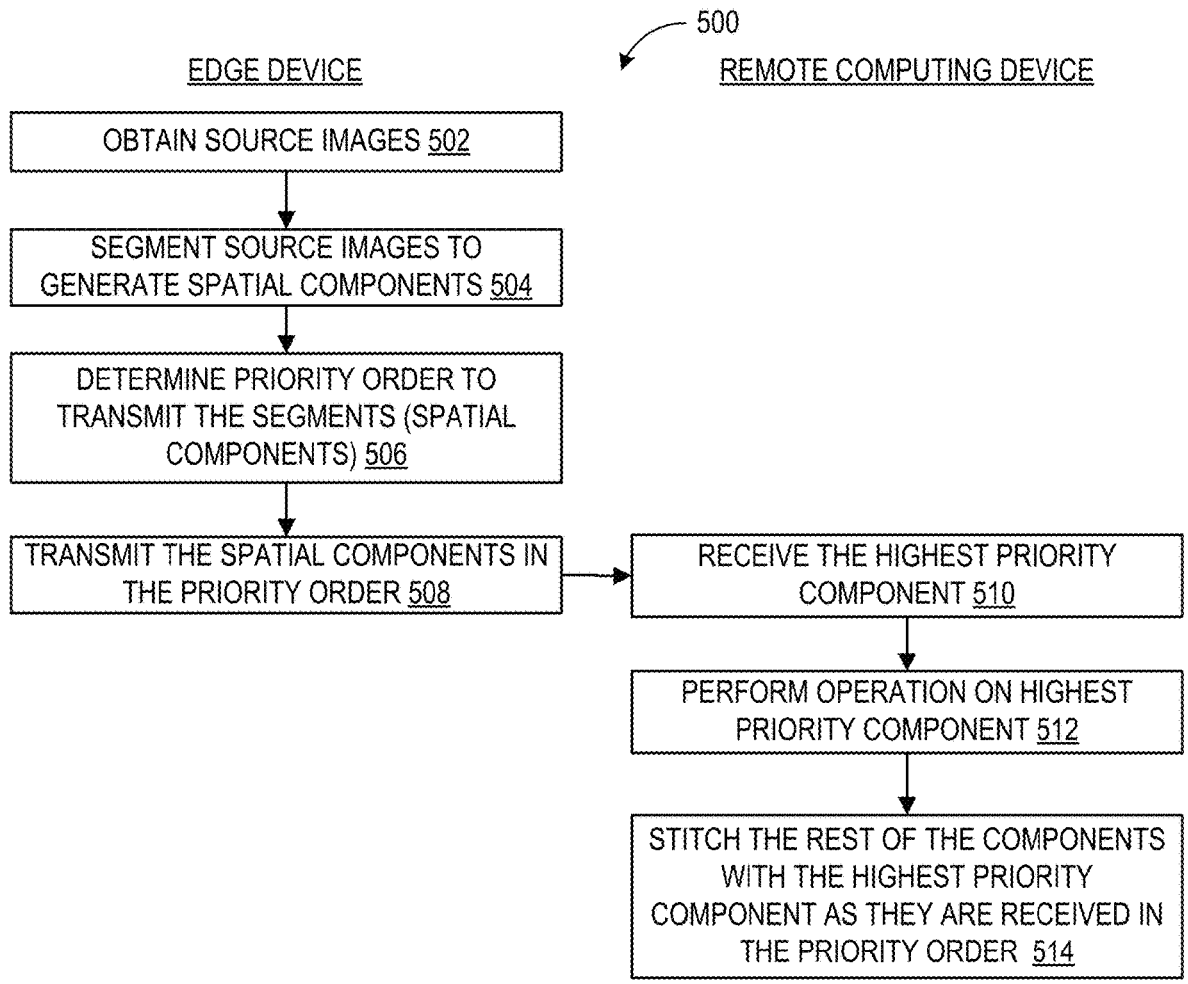
FIG. 6A is a flowchart illustrating an embodiment of a first method of segmenting captured source images into spatial components for transmission.

FIG. 6A illustrates a flowchart of a first method 500 for transmitting or uploading images in segments to a remote computing device according to an example of the present disclosure. In the first method 500, only spatial components are used to transmit the source images to the remote computing device. The following description of method 500 is provided with reference to the software and hardware components described above and shown in FIG. 1. It will be appreciated that method 500 also may be performed in other contexts using other suitable hardware and software components.

At 502, the edge device obtains one or more source images as image data. At 504, the segmentation application of the edge device segments the one or more source images to generate spatial components by spatial decomposition of the one or more source images. At 506, the segmentation application determines a priority order for the plurality of segments to transmit the spatial components to the remote computing device. At 508, the segmentation application transmits the spatial components to the remote computing device in the priority order. At 510, the remote computing device, receiving the spatial components in the priority order, receives the highest priority component first. At 512, the remote computing device performs an operation on the highest priority component. This operation may be an analytic task to derive useful information from the highest priority component. At 514, as the remote computing device receives the rest of the components in the priority order, the remote computing device stitches or assembles the components to complete the image transfer. For example, as a low frequency component of a tree is stitched or assembled together with a higher frequency component of the tree, the image quality of the stitched or assembled image of the tree at the remote computing device improves to approach the source image quality. The lower priority components may be transmitted to the remote computing device as additional bandwidth becomes available in the network connecting the edge device to the remote computing device.

Figure 6B:
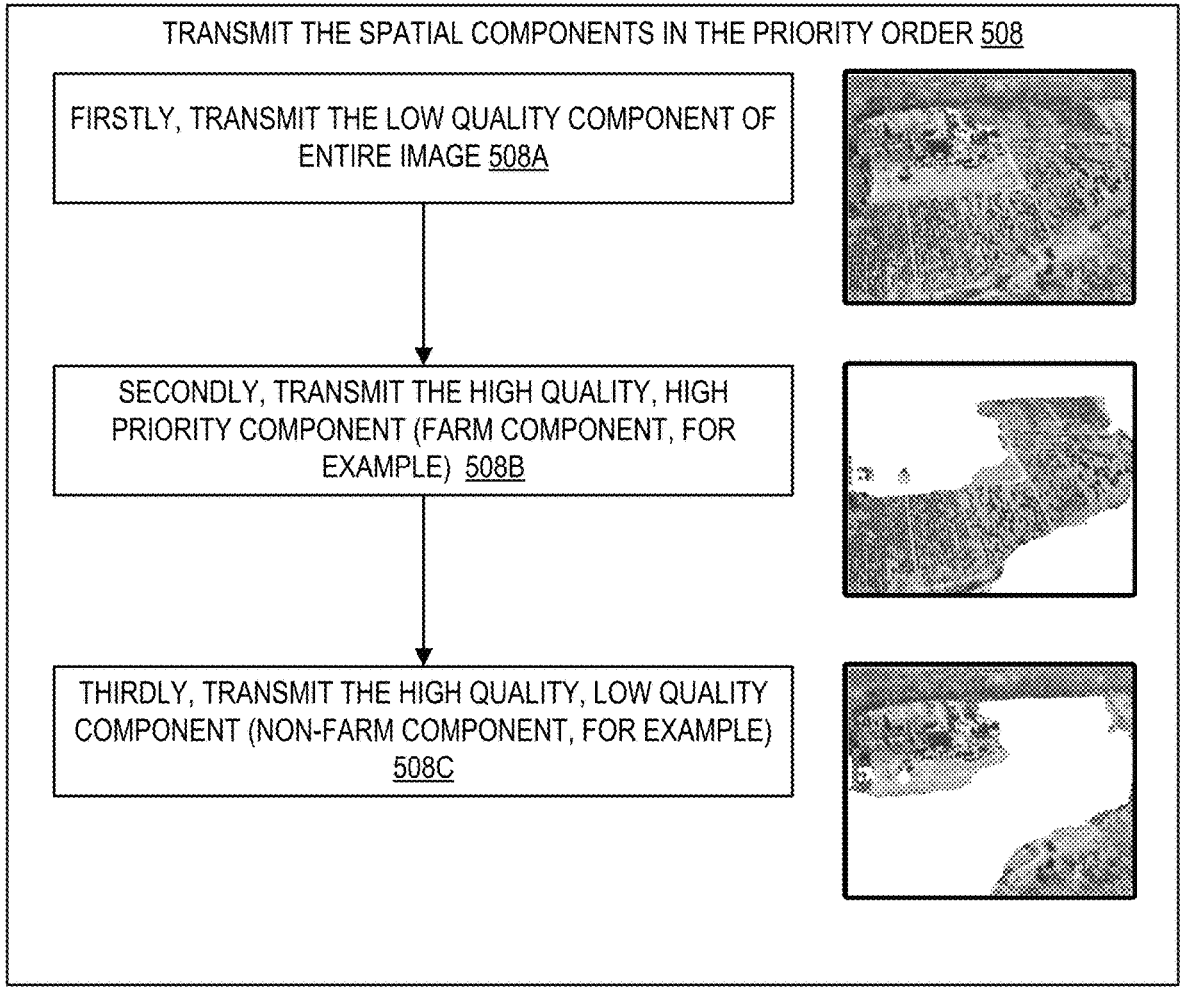
FIG. 6B is an illustration of a flowchart detailing the step in the first method of transmitting the spatial components in the priority order according to a first example.

FIG. 6B illustrates a first example of a flowchart detailing step 508 of the first method 500 in which the spatial components are transmitted to the remote computing device in the priority order that was determined in step 506. At 508A, the edge device may first transmit the low quality component of the entire image. After the low quality component of the entire image is transmitted, at 508B, the edge device may transmit the high quality, high priority component of the image. For example, in agricultural embodiments, this high priority component may be a spatial component of farmland or the trees, which may be the target of analysis by the remote computing device. After the high quality, high priority component of the image is transmitted, at 508C, the edge device may transmit the high quality, low priority component of the image.

Figure 6C:
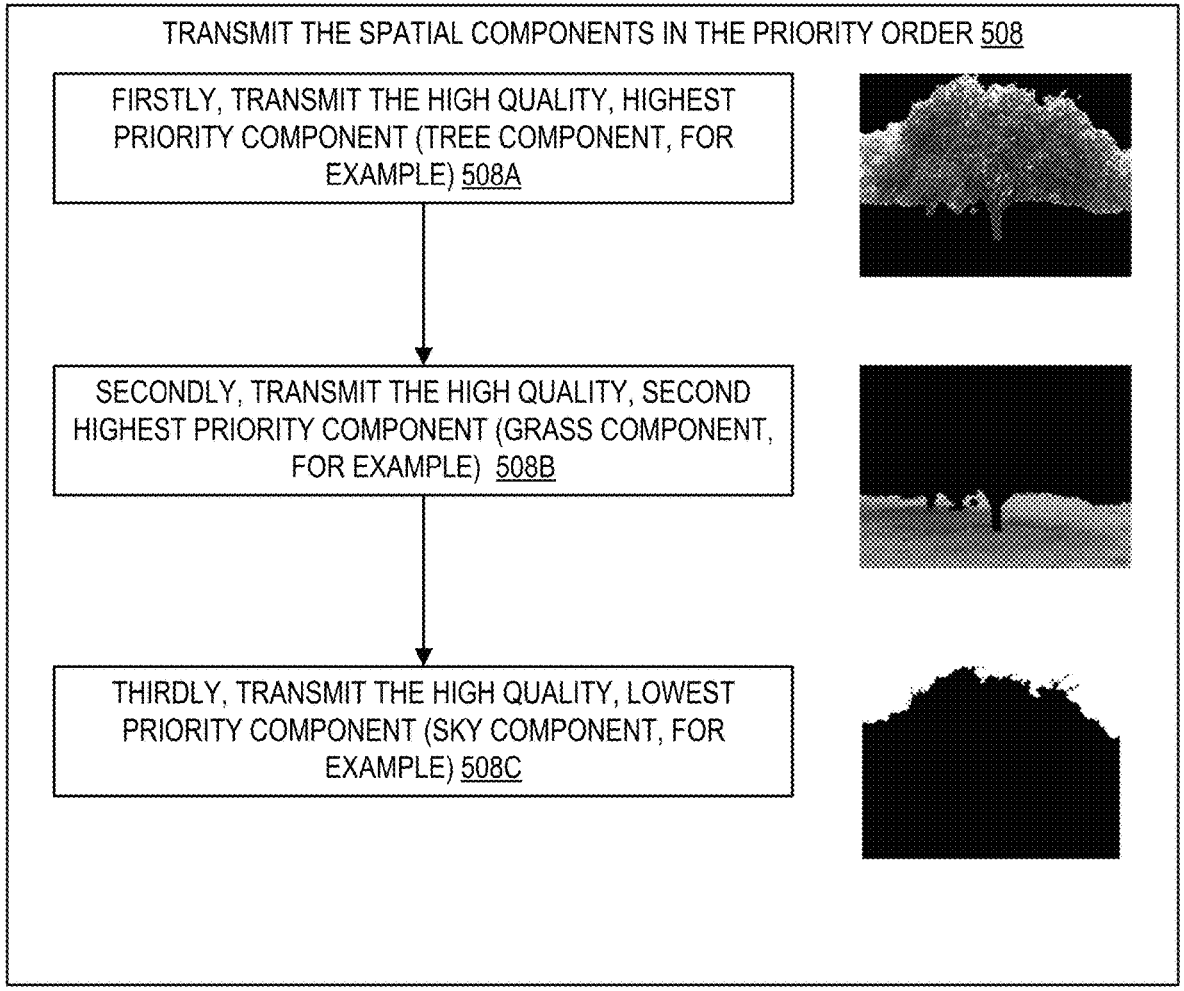
FIG. 6C is an illustration of a flowchart detailing the step in the first method of transmitting the spatial components in the priority order according to a second example.

FIG. 6C illustrates a second example of a flowchart detailing step 508 of the first method 500 in which the spatial components are transmitted to the remote computing device in the priority order that was determined in step 506. At 508A, the edge device may first transmit a high quality image of the highest priority component. In agricultural embodiments, this highest priority component may be a spatial component of farmland or the trees, which may be the target of analysis by the remote computing device. After the highest priority component is transmitted, at 508B, the edge device may transmit the high quality image of the second highest priority component. For example, in agricultural embodiments, this second highest priority component may be a spatial component of grassland. After the second highest priority component of the image is transmitted, at 508C, the edge device may transmit the high quality image of the lowest priority component of the image. In agricultural embodiments, this lowest priority component may be a spatial component of the sky, for example.

Figure 7A:
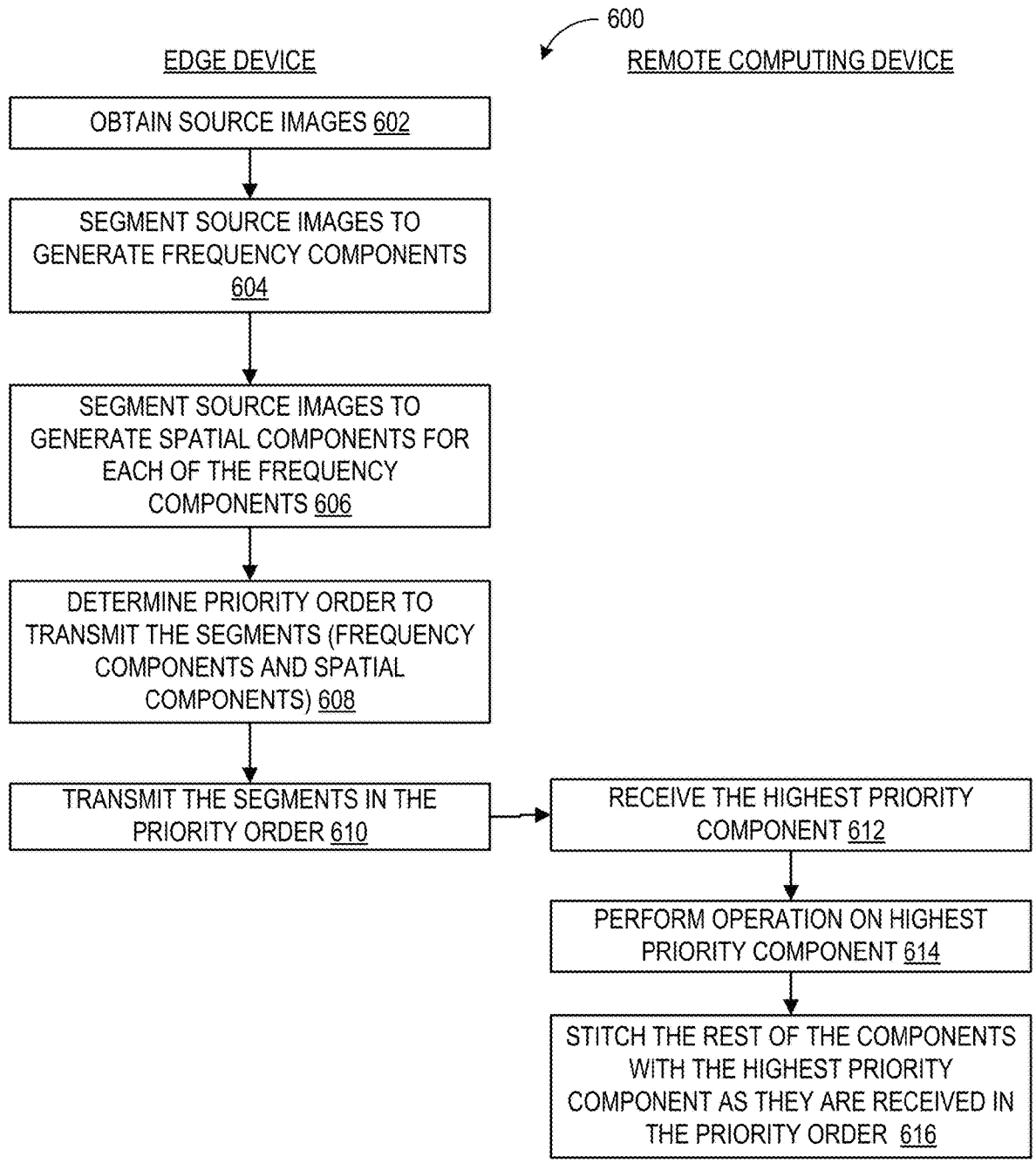
FIG. 7A is a flowchart illustrating an embodiment of a second method of segmenting captured source images into frequency components and spatial components for transmission.

FIG. 7A illustrates a flowchart of a second method 600 for transmitting or uploading images in segments to a remote computing device according to an example of the present disclosure. In the second method 600, both frequency components and spatial components are used to transmit the source images to the remote computing device, where the frequency components are generated first, and then the spatial components are generated for each of the frequency components. The following description of method 600 is provided with reference to the software and hardware components described above and shown in FIG. 1. It will be appreciated that method 600 also may be performed in other contexts using other suitable hardware and software components.

At 602, the edge device obtains one or more source images as image data. At 604, the segmentation application of the edge device segments the one or more source images to generate frequency components by frequency decomposition of the obtained images. At 606, the segmentation application segments the one or more source images to generate spatial components for each of the frequency components by spatial decomposition of the one or more source images. At 608, the segmentation application determines a priority order for the plurality of segments to transmit the frequency components and spatial components to the remote computing device. At 610, the segmentation application transmits the plurality of segments (frequency components and spatial components) to the remote computing device in the priority order. At 612, the remote computing device, receiving the frequency components and spatial components in the priority order, receives the highest priority component first. At 614, the remote computing device performs an operation on the highest priority component. This operation may be an analytic task to derive useful information from the highest priority component. At 616, as the remote computing device receives the rest of the components in the priority order, the remote computing device stitches or assembles the components to complete the image transfer.

Figure 7B:
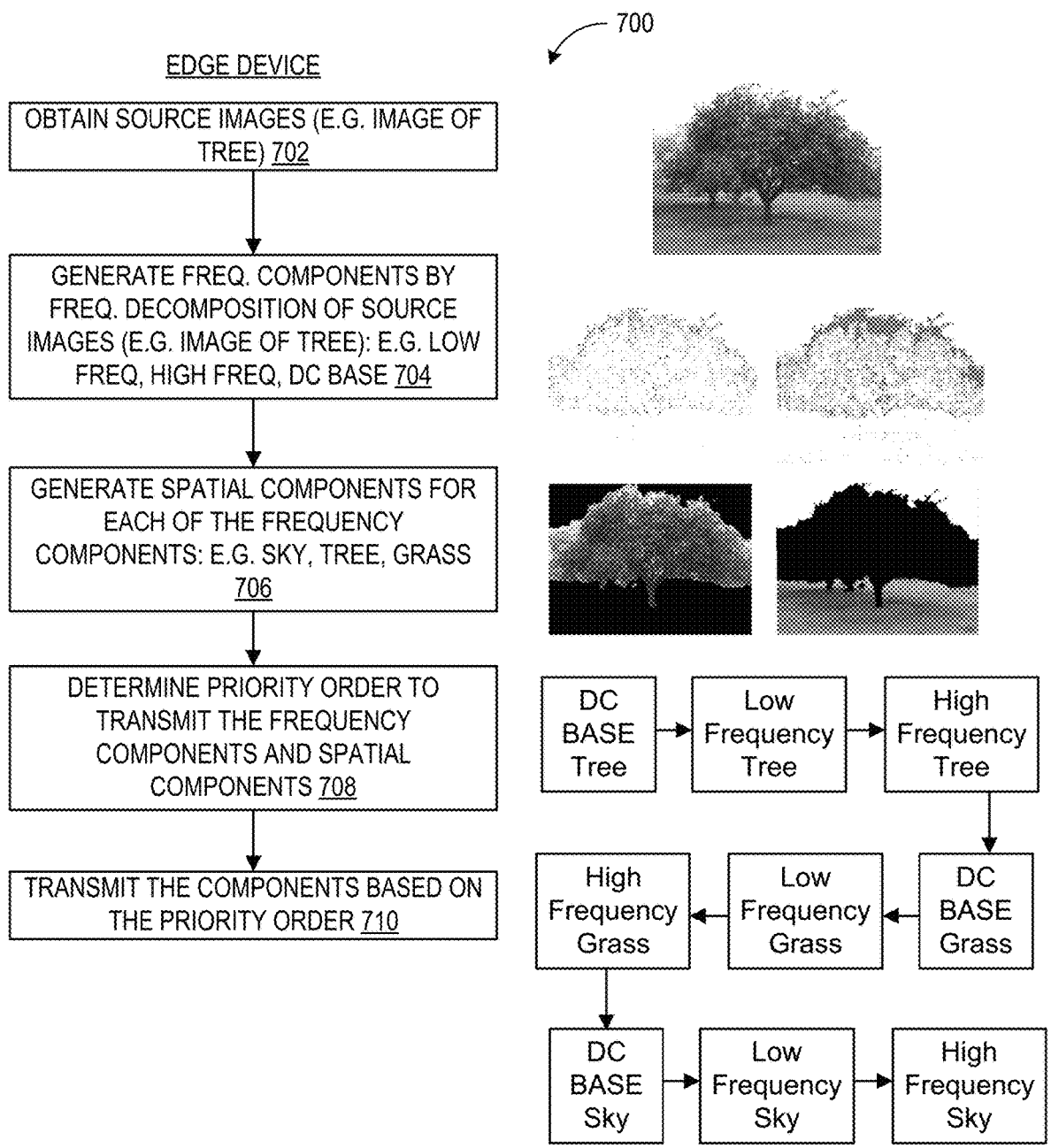
FIG. 7B is a flowchart illustrating an embodiment of a third method of segmenting captured source images into frequency components and spatial components for transmission.

FIG. 7B illustrates a flowchart of a third method 700 applying the second method 600 in an agricultural application for counting fruit in trees according to an example of the present disclosure. In the third method 700, both frequency components and spatial components are used to transmit the source images to the remote computing device. The following description of method 700 is provided with reference to the software and hardware components described above and shown in FIG. 1. It will be appreciated that method 700 also may be performed in other contexts using other suitable hardware and software components. For the sake of brevity, the steps on the remote computing device side are omitted.

At 702, the edge device obtains one or more source images of e.g. a tree. At 704, the segmentation application of the edge device segments the one or more source images to generate frequency components by frequency decomposition of the obtained source images of a tree: e.g. low frequency component, high frequency component, and DC base. At 706, the segmentation application segments the one or more source images to generate spatial components for each of the frequency components by spatial decomposition of the one or more source images: e.g. a sky component, a tree component, and a grass component. At 708, the segmentation application determines a priority order for the plurality of segments to transmit the frequency components and spatial components to the remote computing device. At 710, the segmentation application transmits the plurality of segments (frequency components and spatial components) to the remote computing device in the priority order. In this example, the tree is considered high priority for the application in which fruit is counted on the tree. Accordingly, the priority order is determined to be, e.g., DC base tree, low frequency tree, high frequency tree, DC base grass, low frequency grass, high frequency grass, DC base sky, low frequency sky, and high frequency sky, in this order. The sky components are transmitted last, as they provide the least important data of relevance to the application for counting fruit.

Figure 7C:
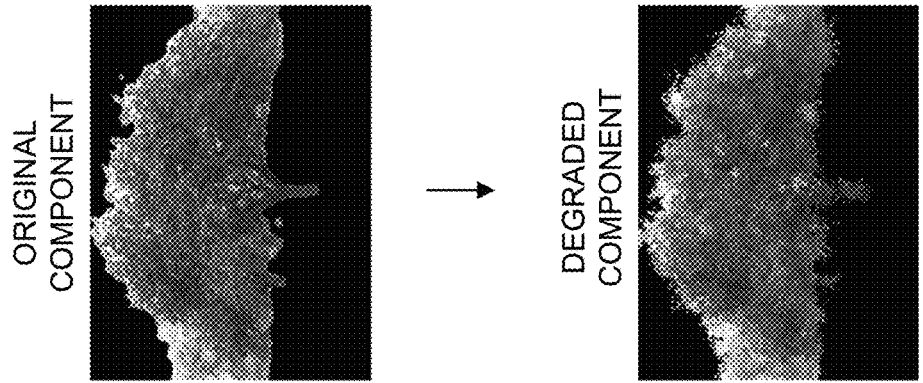
FIG. 7C is an illustration of a flowchart detailing the step in the second and third methods of determining the priority order to transmit the frequency components and the spatial components according to one example.
Figure 7C:
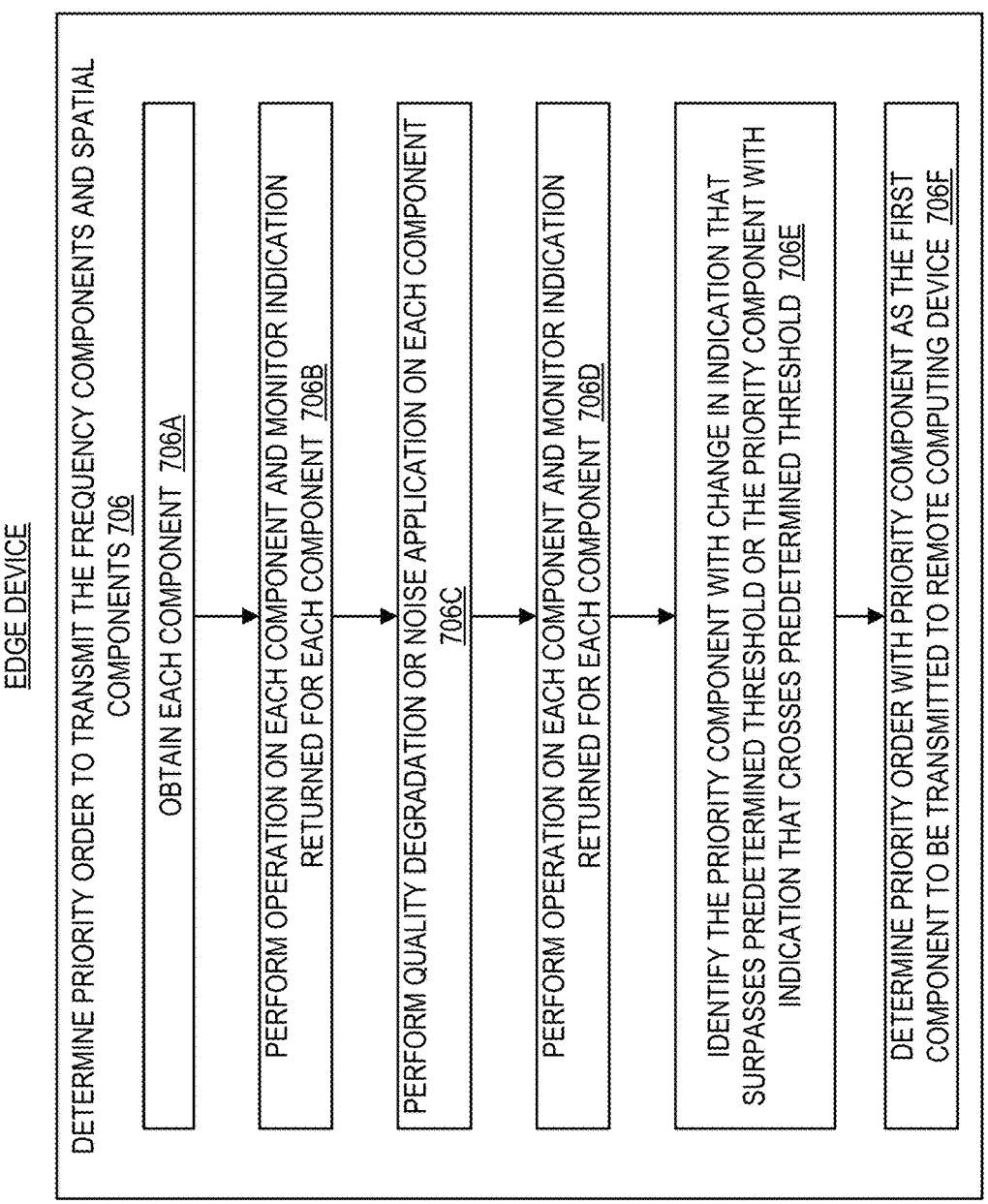

FIG. 7C illustrates a flowchart detailing step 706 of the third method 700 or step 606 of the second method 600 in which the priority order for transmitting the components to the remote computing device is determined. It will be appreciated that the flowchart of FIG. 7 also describes the application sensitivity algorithm 132 used by the segmentation application 118 of the edge device 102.

At 706A, each component is obtained. At 706B, an operation is performed by the image processing application 134 on each component to obtain or monitor an indication returned as a result of performing the operation on the component. At 706C, the quality of each component is degraded, or noise is added to each component. At 706D, the operation is again performed by the image processing application 134 on each component to obtain or monitor an indication returned as a result of performing the operation on the component. At 706E, the segmentation application identifies the priority component with a change in indication that surpasses a predetermined threshold, or the priority component with an indication that crosses a predetermined threshold. At 706F, the segmentation application determines a priority order with this priority component as the first component to be transmitted to the remote computing device.

Figure 7D:
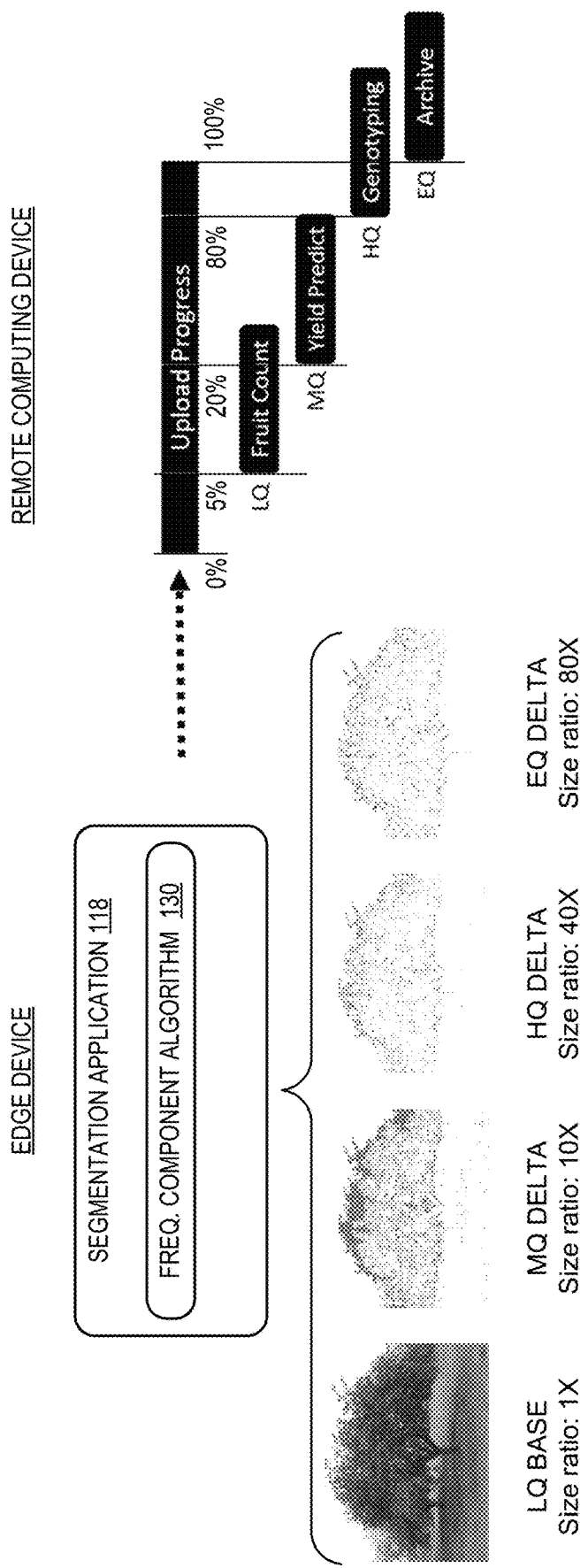
FIG. 7D is an illustration of one example implementation of the algorithms that may be executed on different frequency components of the source images as the different frequency components are received by the remote computing device in priority order.

FIG. 7D illustrates one example implementation of the algorithms that may be executed on different frequency components of the source images as the different frequency components are received by the remote computing device in priority order. In this example, four frequency components are generated by the segmentation application 118 executing the frequency component algorithm 130: LQ base, which has a size ratio of 1×, MQ delta, which has a size ratio of 10×, HQ delta, which has a size ratio of 40×, and EQ Delta, which has a size ratio of 80×. The edge device transmits the LQ base frequency component, the MQ Delta frequency component, the HQ Delta frequency component, and the EQ Delta frequency component to the remote computing device, in this order.

When the remote computing device finishes uploading 5% of the source image, the upload of the LQ base frequency component may have finished. Therefore, upon finishing the upload of the LQ base frequency component, a fruit count algorithm may be executed by the remote computing device on the LQ base frequency component to conduct a fruit count, as the image quality of the LQ base frequency component may be sufficient to conduct an acceptable fruit count.

Subsequently, when the remote computing device finishes uploading 20% of the source image, the upload of the MQ Delta frequency component may have finished. Therefore, upon finishing the upload of the MQ Delta frequency component, a yield prediction algorithm may be executed by the remote computing device on the MQ Delta frequency component to perform a yield prediction, as the image quality of the MQ Delta frequency component may be sufficient to perform an acceptable yield prediction.

Subsequently, when the remote computing device finishes uploading 80% of the source image, the upload of the HQ Delta frequency component may have finished. Therefore, upon finishing the upload of the HQ Delta frequency component, a genotyping algorithm may be executed by the remote computing device on the HQ Delta frequency component to perform genotyping, as the image quality of the HQ Delta frequency component may be sufficient to perform genotyping. Subsequently, upon completion of the upload of the entire source image, the entire source image may be archived by the remote computing device for further processing at a later time.

Figure 8A:
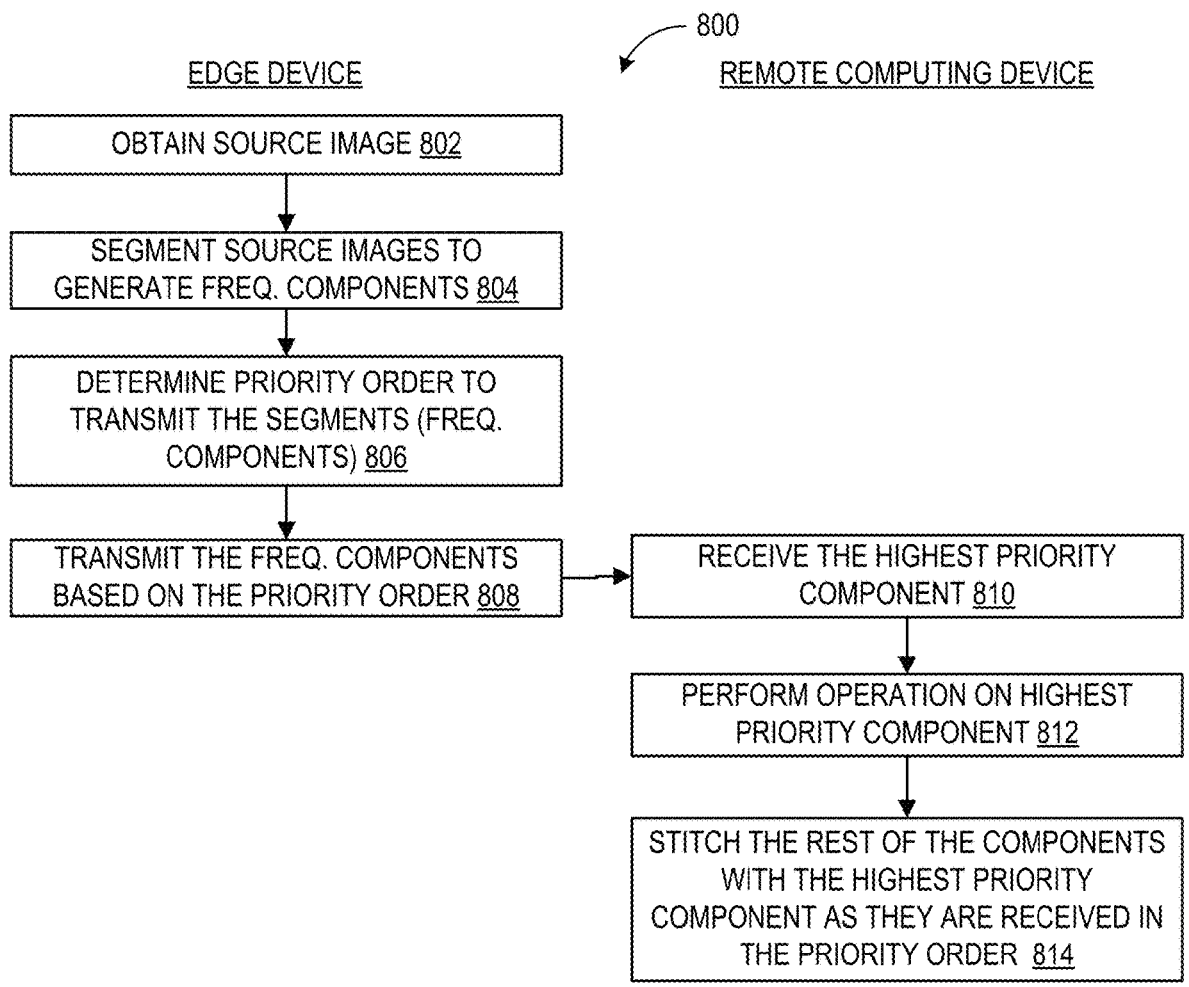
FIG. 8A is a flowchart illustrating an embodiment of a fourth method of segmenting captured source images into only frequency components for transmission.

FIG. 8A illustrates a flowchart of a fourth method 800 for transmitting or uploading images in segments to a remote computing device according to an example of the present disclosure. In the fourth method 800, only frequency components are used to transmit the source images to the remote computing device. The following description of method 800 is provided with reference to the software and hardware components described above and shown in FIG. 1. It will be appreciated that method 800 also may be performed in other contexts using other suitable hardware and software components.

At 802, the edge device obtains one or more source images as image data. At 804, the segmentation application of the edge device segments the one or more source images to generate frequency components by frequency decomposition of the obtained images. At 806, the segmentation application determines a priority order for the plurality of segments to transmit the frequency components to the remote computing device. At 808, the segmentation application transmits the plurality of segments (frequency components) to the remote computing device in the priority order. At 810, the remote computing device, receiving the frequency components in the priority order, receives the highest priority component first. At 812, the remote computing device performs an operation on the highest priority component. This operation may be an analytic task to derive useful information from the highest priority component. At 814, as the remote computing device receives the rest of the components in the priority order, the remote computing device stitches or assembles the components to complete the image transfer.

Figure 8B:
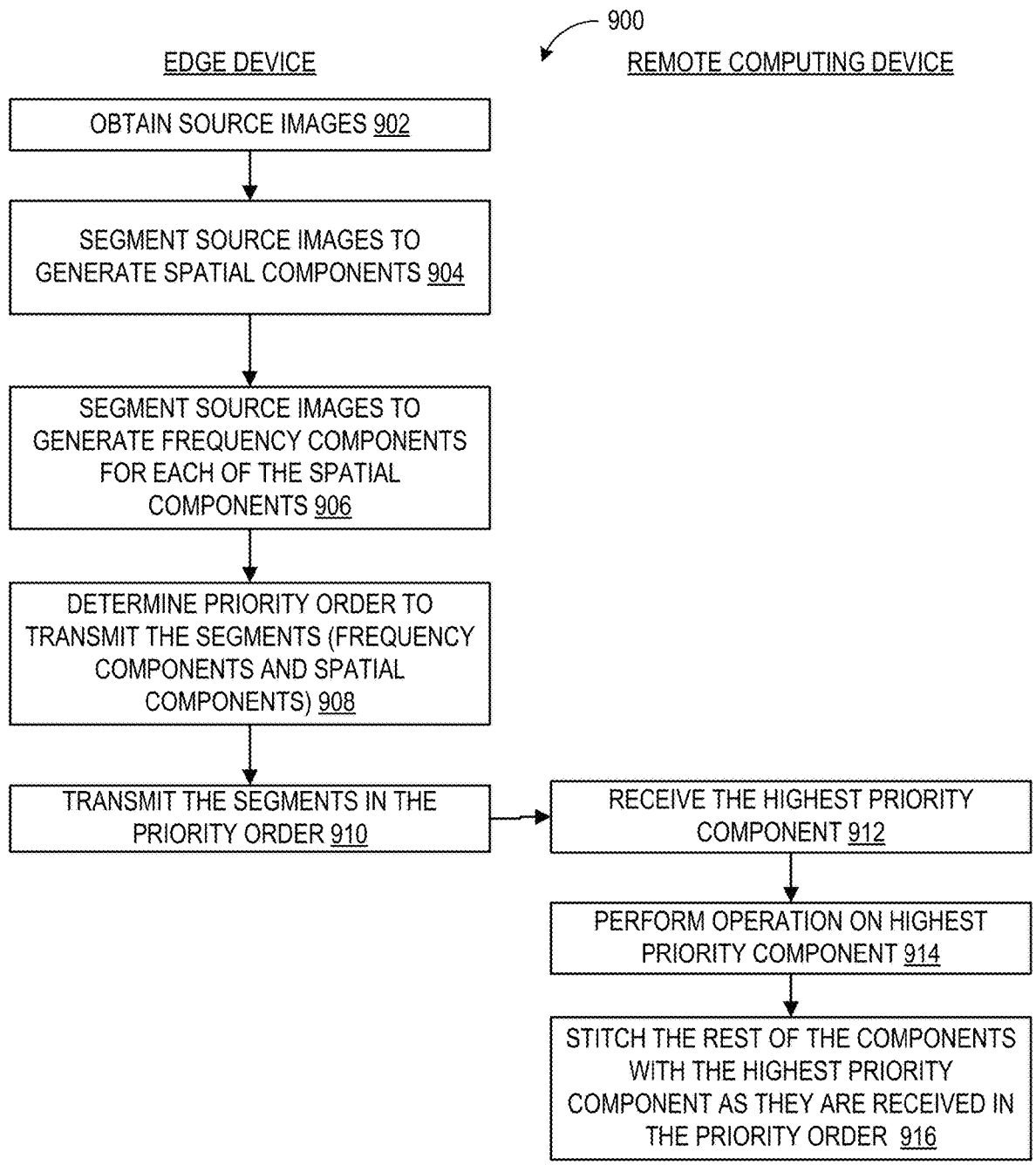
FIG. 8B is a flowchart illustrating an embodiment of a fifth method of segmenting captured source images into frequency components and spatial components for transmission.

FIG. 8B illustrates a flowchart of a fifth method 900 for transmitting or uploading images in segments to a remote computing device according to an example of the present disclosure. In the fifth method 900, both frequency components and spatial components are used to transmit the source images to the remote computing device. However, unlike the second method 600, where the frequency components are generated first, and then the spatial components are generated for each of the frequency components, in the fifth method 900, the spatial components are generated first, and then the frequency components are generated for each of the spatial components. The following description of method 900 is provided with reference to the software and hardware components described above and shown in FIG. 1. It will be appreciated that method 900 also may be performed in other contexts using other suitable hardware and software components.

At 902, the edge device obtains one or more source images as image data. At 904, the segmentation application of the edge device segments the one or more source images to generate spatial components by spatial decomposition of the obtained images. At 906, the segmentation application segments the one or more source images to generate frequency components for each of the spatial components by frequency decomposition of the one or more source images. At 908, the segmentation application determines a priority order for the plurality of segments to transmit the frequency components and spatial components to the remote computing device. At 910, the segmentation application transmits the plurality of segments (frequency components and spatial components) to the remote computing device in the priority order. At 912, the remote computing device, receiving the frequency components and spatial components in the priority order, receives the highest priority component first. At 914, the remote computing device performs an operation on the highest priority component. This operation may be an analytic task to derive useful information from the highest priority component. At 916, as the remote computing device receives the rest of the components in the priority order, the remote computing device stitches or assembles the components to complete the image transfer.

Figure 9:
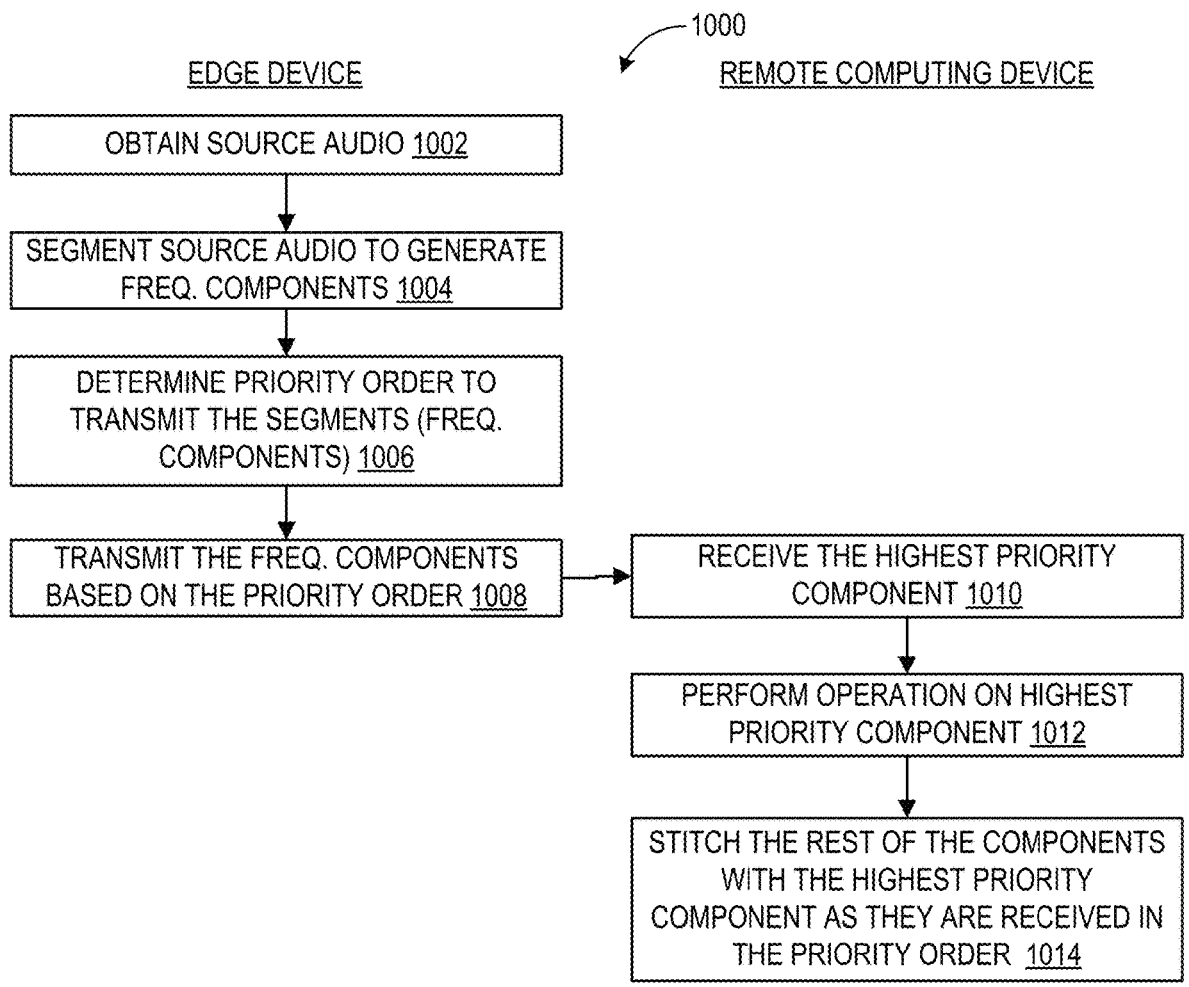
FIG. 9 is a flowchart illustrating an embodiment of a sixth method of segmenting audio data into frequency components for transmission.

It will be appreciated that the segmentation application is not limited to segmenting images. As illustrated in FIG. 9, a flowchart is depicted of a sixth method 1000 for transmitting or uploading images in segments to a remote computing device according to an example of the present disclosure. In the sixth method 1000, only frequency components are used to transmit the source audio to the remote computing device. The following description of method 1000 is provided with reference to the software and hardware components described above and shown in FIG. 1. It will be appreciated that method 1000 also may be performed in other contexts using other suitable hardware and software components.

At 1002, the edge device obtains source audio. As illustrated in FIG. 1, the source audio may be audio data 116 captured by the microphone 114. At 1004, the segmentation application of the edge device segments the source audio to generate frequency components by frequency decomposition of the obtained source audio. At 1006, the segmentation application determines a priority order for the plurality of segments to transmit the frequency components to the remote computing device. At 1008, the segmentation application transmits the plurality of segments (frequency components) to the remote computing device in the priority order. At 1010, the remote computing device, receiving the frequency components in the priority order, receives the highest priority component first. At 1012, the remote computing device performs an operation on the highest priority component. This operation may be an analytic task to derive useful information from the highest priority component. At 1014, as the remote computing device receives the rest of the components in the priority order, the remote computing device stitches or assembles the components to complete the audio transfer.

Accordingly, an image compression system is described in which the system automatically detects segments of images that are important for analysis in the cloud server, and transmits these segments at a higher priority than other, less important segments. The raw image data may be encoded in a progressive format, which means that the images can be made sense of at the remote computing device right away as important segments of the image increase in fidelity at a faster pace than the other, less important segments. This may achieve the potential advantage of improving latency many fold in image transfers between edge devices and remote computing devices.

It will be appreciated that the above described methods and computing devices may be applied to other domains besides the agricultural field as well, such as oil and gas extraction, fishing, search and rescue, security systems, etc.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
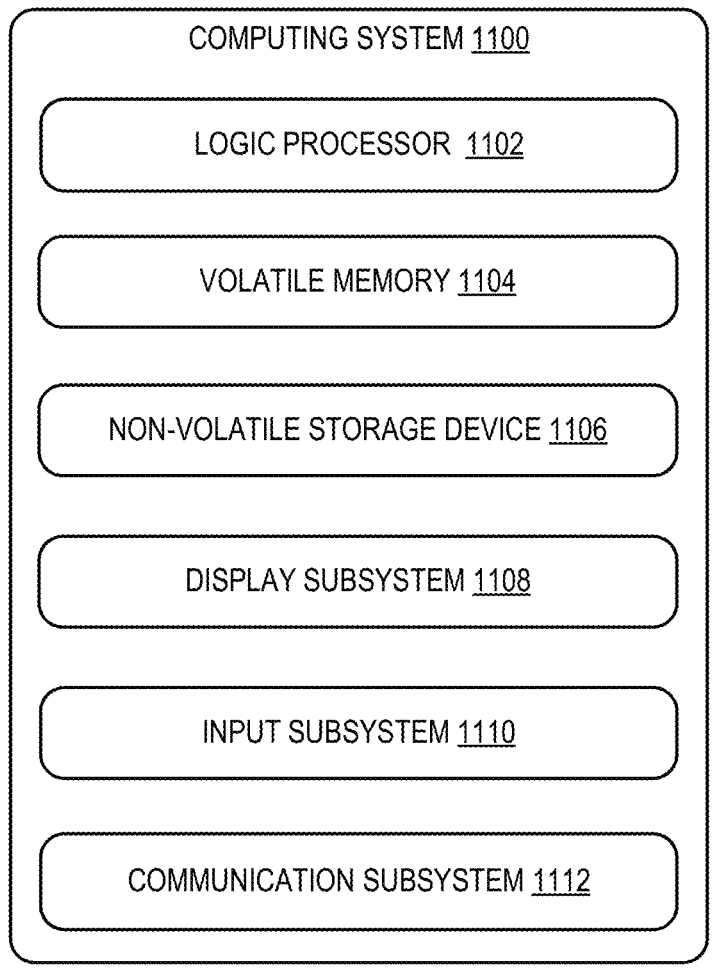
FIG. 10 shows a computing system according to an embodiment of the present disclosure.

FIG. 10 schematically shows a non-limiting embodiment of a computing system 1100 that can enact one or more of the methods and processes described above. Computing system 1100 is shown in simplified form. Computing system 1100 may embody the computing device 106 or image capture device 102 of FIG. 1. Computing system 1100 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1100 includes a logic processor 1102 volatile memory 1104, and a non-volatile storage device 1106. Computing system 1100 may optionally include a display subsystem 1108, input subsystem 1110, communication subsystem 1112, and/or other components not shown in FIG. 10.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built-in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 typically implemented in software by a processor to perform a particular function using portions of volatile memory, which function involves transformative processing that specially configures the processor to perform the function. Thus, a module, program, or engine may be instantiated via logic processor 1102 executing instructions held by nonvolatile storage device 1106, using portions of volatile memory 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as Bluetooth and HDMI over Wi-Fi connection. In some embodiments, the communication subsystem may allow computing system 1100 to send and/or receive messages to and/or from other devices via a network such as the Internet.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The following paragraphs provide additional support for the claims of the subject application. One aspect provides a method comprising: obtaining one or more source images as image data at an edge device; segmenting the one or more source images to generate a plurality of segments; determining a priority order for the plurality of segments; and transmitting the plurality of segments to a remote computing device in the priority order, the plurality of segments being generated as spatial components generated by spatial decomposition of the one or more source images and/or frequency components that are generated by frequency decomposition of the one or more source images. In this aspect, additionally or alternatively, the frequency decomposition may be a degradation of image quality. In this aspect, additionally or alternatively, the frequency decomposition may be a decomposition of a frequency of visual characteristics of the one or more source images. In this aspect, additionally or alternatively, the one or more source images may be encoded in a compression format that supports the frequency decomposition. In this aspect, additionally or alternatively, the compression format may be one of JPEG XR, JPEG 2000, and AV1. In this aspect, additionally or alternatively, the spatial components may be generated via at least one of human input or a machine learning algorithm trained on labeled visual features. In this aspect, additionally or alternatively, when generating the plurality of segments, the plurality of frequency components may be generated first, followed by the plurality of spatial components for each of the plurality of frequency components. In this aspect, additionally or alternatively, the priority order may be determined by performing an operation on each component which returns an indication, applying an application sensitivity algorithm to add noise or perform quality degradation on each component. In this aspect, additionally or alternatively, the plurality of source images may be filtered to select a subset of the plurality of source images to segment and transmit. In this aspect, additionally or alternatively, the subset of the plurality of source images may be images of a target object for analysis.

Another aspect provides a computing device, comprising: a logic subsystem comprising one or more processors; and memory storing instructions executable by the logic subsystem to: obtain one or more source images; segment the one or more source images to generate a plurality of segments; determine a priority order for the plurality of segments; and transmit the plurality of segments to a remote computing device in the priority order, the plurality of segments being spatial components generated by spatial decomposition of the one or more source images and/or frequency components that are generated by frequency decomposition of the one or more source images. In this aspect, additionally or alternatively, the frequency decomposition may be a degradation of image quality. In this aspect, additionally or alternatively, the frequency decomposition may be a decomposition of a frequency of visual characteristics of the one or more source images. In this aspect, additionally or alternatively, the one or more source images may be encoded in a compression format that supports the frequency decomposition. In this aspect, additionally or alternatively, the spatial components may be generated via at least one of human input or a machine learning algorithm trained on labeled visual features. In this aspect, additionally or alternatively, when generating the plurality of segments, the plurality of frequency components may be generated first, followed by the plurality of spatial components for each of the plurality of frequency components. In this aspect, additionally or alternatively, the priority order may be determined by performing an operation on each component which returns an indication, applying an application sensitivity algorithm to add noise or perform quality degradation on each component. In this aspect, additionally or alternatively, the plurality of source images may be filtered to select a subset of the plurality of source images to segment and transmit. In this aspect, additionally or alternatively, the subset of the plurality of source images may be images of a target object for analysis.

Another aspect provides a computing device, comprising: a logic subsystem comprising one or more processors; and memory storing instructions executable by the logic subsystem to: obtain one or more audio data; segment the one or more audio data to generate a plurality of segments; determine a priority order for the plurality of segments; and transmit the plurality of segments to a remote computing device in the priority order, the plurality of segments being spatial components generated by spatial decomposition of the one or more source images and/or frequency components that are generated by frequency decomposition of the one or more source images.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
performing spatial decomposition and/or frequency decomposition of one or more source images to thereby respectively generate a plurality of spatial components and/or frequency components;
determining a priority order for the plurality of spatial components and/or frequency components, wherein the priority order is determined by:
adding noise to or performing quality degradation on one or more of the plurality of spatial components and/or frequency components,
obtaining a measurement of an effect of the noise or the quality degradation on objects in the one or more source images, and
determining the priority order based at least in part on the measurement; and
transmitting the plurality of spatial components and/or frequency components to a remote computing device in the priority order.

2. The method of claim 1, wherein
the components comprise the frequency components; and
the frequency decomposition is a degradation of image quality.

3. The method of claim 1, wherein
the components comprise the frequency components; and
the frequency decomposition is a decomposition of a frequency of visual characteristics of the one or more source images.

4. The method of claim 1, wherein
the components comprise the frequency components; and
the one or more source images are encoded in a compression format that supports the frequency decomposition.

5. The method of claim 4, wherein
the compression format is one of JPEG XR, JPEG 2000, and AV1.

6. The method of claim 1, wherein
the components comprise the spatial components; and
the spatial components are generated via at least one of human input or a machine learning algorithm trained on labeled visual features.

7. The method of claim 1, wherein
the components comprise the spatial components and the frequency components; and
the frequency components are generated first, followed by the spatial components for each of the frequency components.

8. The method of claim 1, further comprising:
applying an application sensitivity algorithm to add the noise to, or perform the quality degradation on, each component.

9. The method of claim 1, wherein
the one or more source images are filtered to select a subset of the one or more of source images to perform spatial decomposition and/or frequency decomposition and transmit.

10. The method of claim 9, wherein
the subset of the one or more source images are images of a target object for analysis.

11. A computing device, comprising:
a logic subsystem comprising one or more processors; and memory storing instructions executable by the logic subsystem to:
perform spatial decomposition and/or frequency decomposition of one or more source images to thereby respectively generate a plurality of spatial components and/or frequency components;
determine a priority order for the plurality of spatial components and/or frequency components, wherein the priority order is determined by:
adding noise to or performing quality degradation on one or more of the plurality of spatial components and/or frequency components,
obtaining a measurement of an effect of the noise or the quality degradation on objects in the one or more source images, and
determining the priority order based at least in part on the measurement; and
transmitting the plurality of spatial components and/or frequency components to a remote computing device in the priority order.

12. The computing device of claim 11, wherein
the components comprise the frequency components; and
the frequency decomposition is a degradation of image quality.

13. The computing device of claim 11, wherein
the components comprise the frequency components; and
the frequency decomposition is a decomposition of a frequency of visual characteristics of the one or more source images.

14. The computing device of claim 11, wherein
the components comprise the frequency components; and
the one or more source images are encoded in a compression format that supports the frequency decomposition.

15. The computing device of claim 11, wherein
the components comprise the spatial components; and the spatial components are generated via at least one of human input or a machine learning algorithm trained on labeled visual features.

16. The computing device of claim 11, wherein
the components comprise the spatial components and the frequency components; and
the frequency components are generated first, followed by the spatial components for each of the frequency components.

17. The computing device of claim 11, wherein
an application sensitivity algorithm is applied to add the noise to or perform the quality degradation on each component.

18. The computing device of claim 11, wherein
the one or more source images are filtered to select a subset of the one or more source images to segment and transmit.

19. The computing device of claim 18, wherein
the subset of the one or more source images are images of a target object for analysis.

20. A computing device, comprising:
a logic subsystem comprising one or more processors; and
memory storing instructions executable by the logic subsystem to:
perform spatial decomposition and/or frequency decomposition of one or more source images to thereby respectively generate a plurality of spatial components and/or frequency components;
determine a priority order for the plurality of spatial components and/or frequency components, wherein the priority order is determined by:
adding noise to or performing quality degradation on one or more of the plurality of spatial components and/or frequency components,
obtaining a measurement of an effect of the noise or the quality degradation on objects in the one or more source images, and
determining the priority order based at least in part on the measurement; and
transmitting the plurality of spatial components and/or frequency components to a remote computing device in the priority order.

* * * * *